United States Patent [19]
Fiez et al.

[11] Patent Number: 5,677,618
[45] Date of Patent: Oct. 14, 1997

[54] DC-TO-DC SWITCHING POWER SUPPLY UTILIZING A DELTA-SIGMA CONVERTER IN A CLOSED LOOP CONTROLLER

[75] Inventors: Terri S. Fiez, Pullman, Wash.; Gregory M. Cooley, Dallas, Tex.; Bryan Buchanan, Gig Harbor, Wash.

[73] Assignees: The Boeing Company, Seattle; Washington State University Research Foundation, Pullman, both of Wash.

[21] Appl. No.: 607,031

[22] Filed: Feb. 26, 1996

[51] Int. Cl.$^6$ .................................................. G05F 1/56
[52] U.S. Cl. ............................................. 323/282; 323/283
[58] Field of Search .................................. 323/282, 284, 323/285, 288, 351; 363/123, 80

[56] References Cited

U.S. PATENT DOCUMENTS

| | | | |
|---|---|---|---|
| 4,095,165 | 6/1978 | Boros | 323/17 |
| 4,109,194 | 8/1978 | Miller | 323/17 |
| 4,954,767 | 9/1990 | Buisson et al. | 323/283 |
| 4,974,141 | 11/1990 | Severinsky et al. | 363/81 |
| 5,349,523 | 9/1994 | Inou et al. | 363/97 |
| 5,479,090 | 12/1995 | Schultz | 323/284 |
| 5,490,054 | 2/1996 | Hanebrink, Jr. | 363/21 |

OTHER PUBLICATIONS

"Electronic Engineering" (UK), A.E. Whittaker, vol. 50, No. 611; p. 23, Sep. 1978.

Primary Examiner—Adolf Berhane
Attorney, Agent, or Firm—James P. Hamley

[57] ABSTRACT

A DC-to-DC switching power supply (12) receives a DC biased power signal at a first input (14), a control signal at its control input (16) and produces an output DC voltage at its output terminal (20). A power supply controller (30) compares the produced output signal $V_{out}$ with an input reference signal $V_{ref}$. The reference signal is an analog signal which may be produced via digital-to-analog converter (34) which converts a digital input command into a corresponding analog signal $V_{ref}$. The resulting error signal is then passed through a proportional gain block 36 and an integral gain block (38). A signal proportional to the differential of the output voltage is passed through a differential gain block (44). The outputs from the proportional gain block (36) integrator gain block (38) differential gain block (44) are summed in the second summer (40) and applied as the input to a delta-sigma converter (42). The output from delta-sigma (42) then constitutes a fixed-width pulse stream of predetermined sequence such that, when applied to the control input (16) of the switching power supply (12), the power supply produces a DC output signal $V_{out}$ at its output terminal (20) which is determined by the reference signal $V_{ref}$

10 Claims, 10 Drawing Sheets

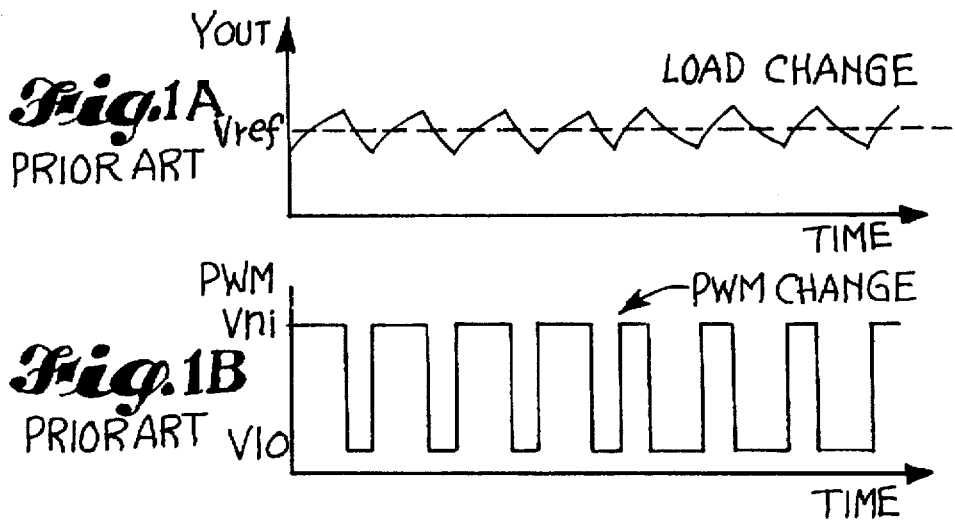
Fig.1A PRIOR ART
Fig.1B PRIOR ART
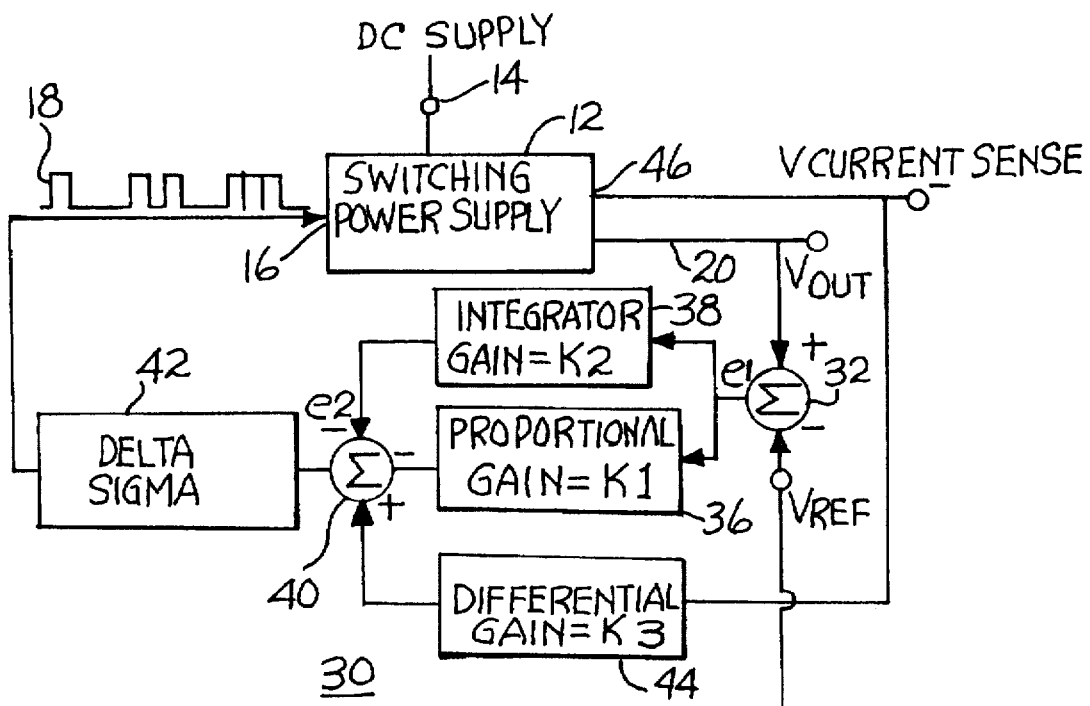
Fig.2
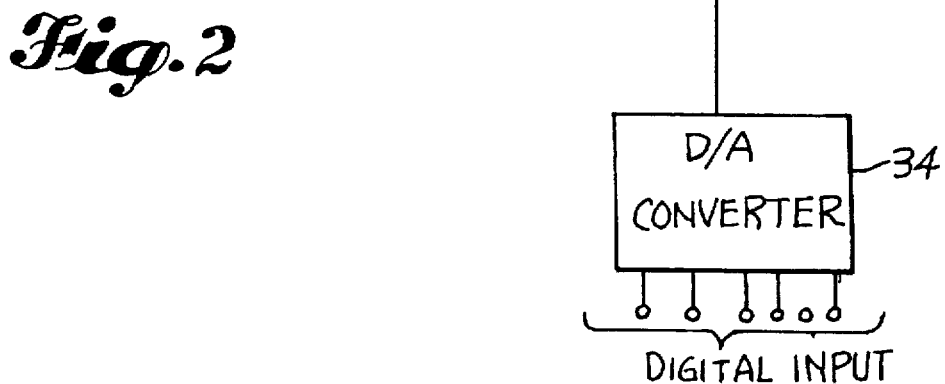

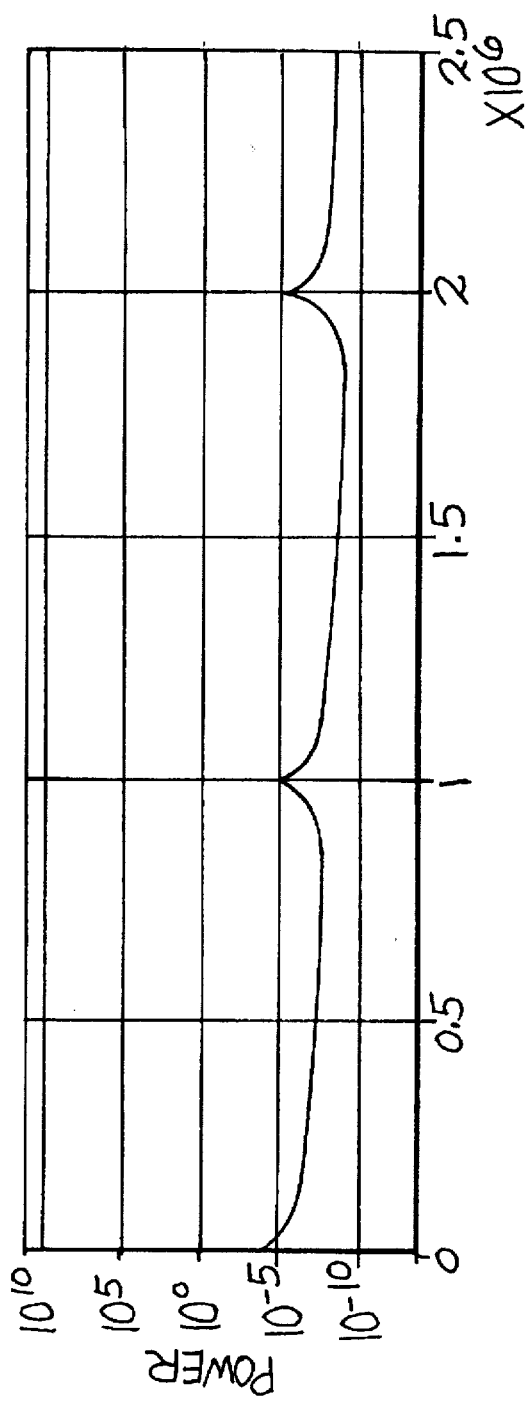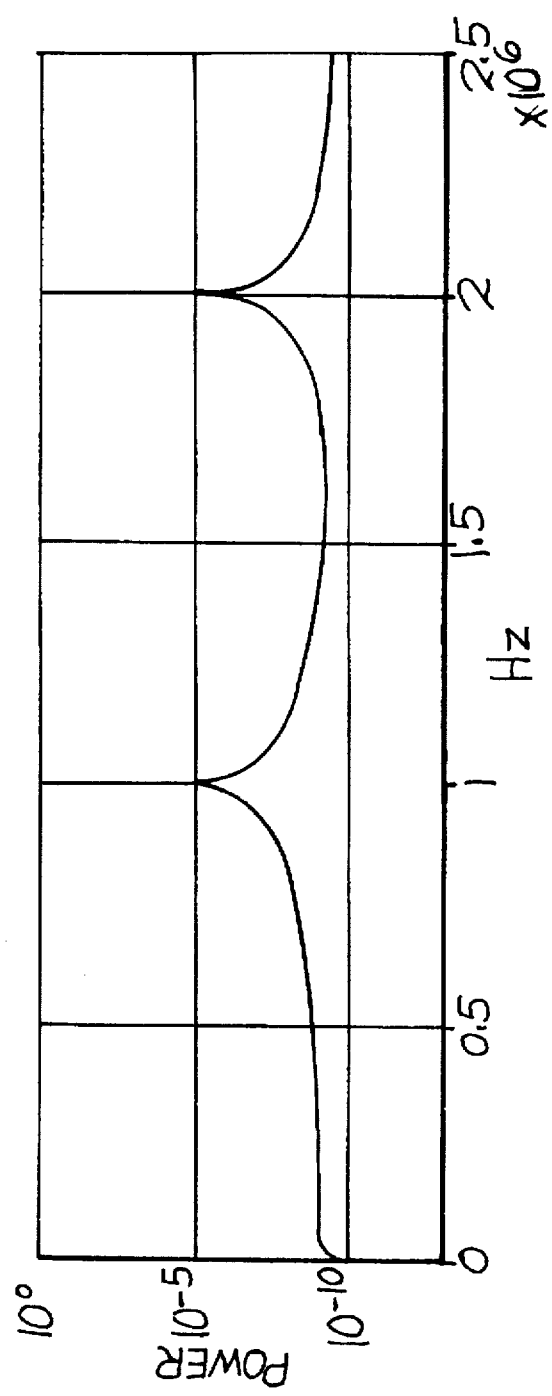
Fig. 10A
Fig. 10B

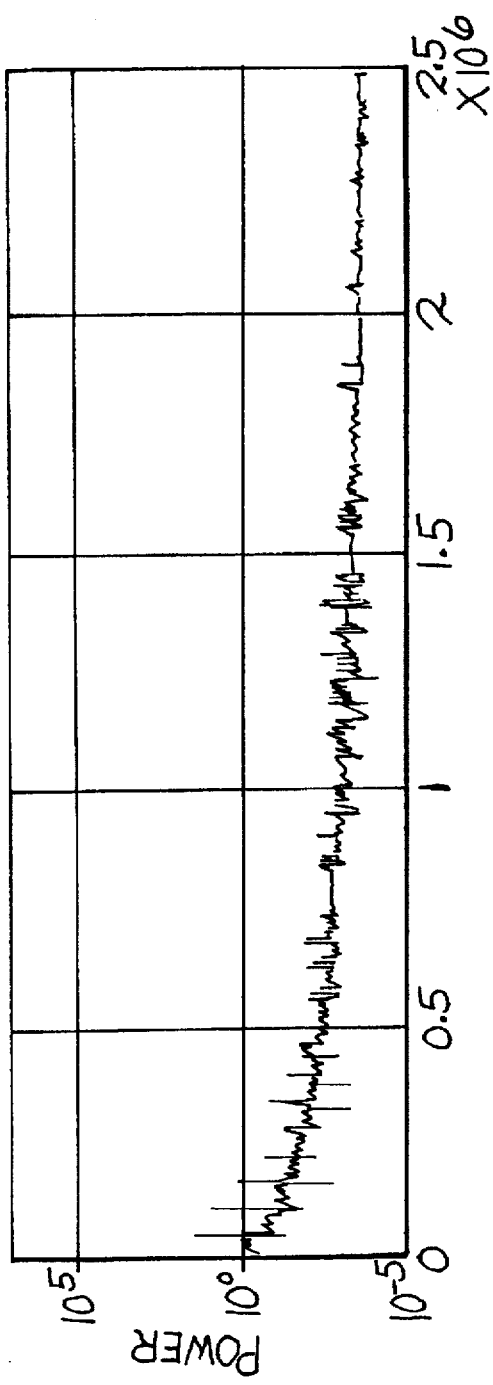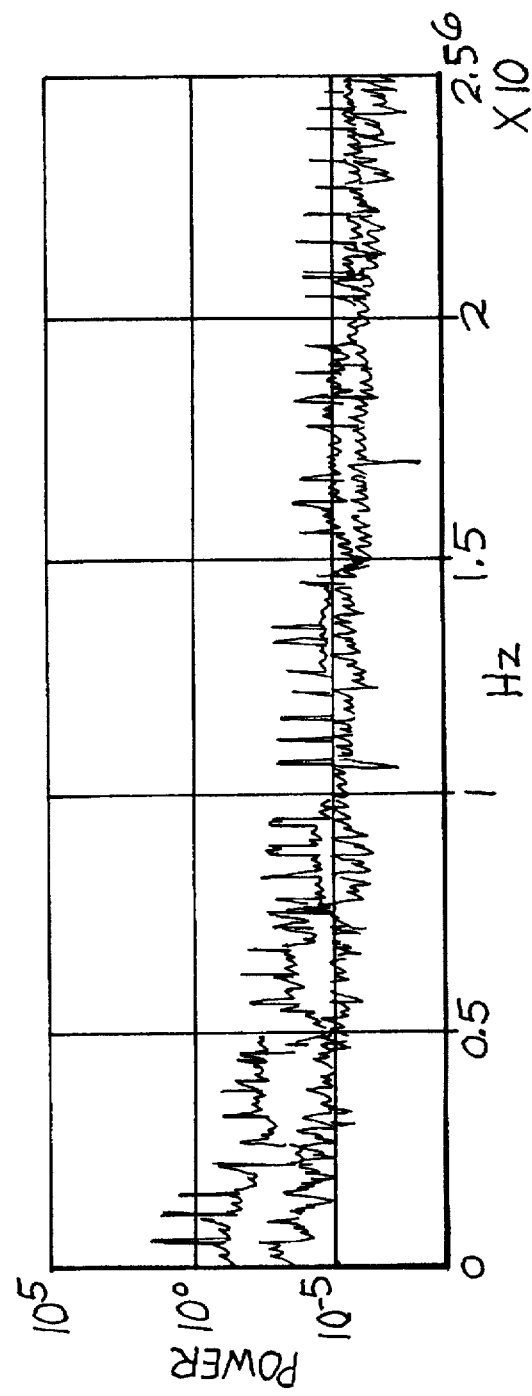
Fig. 11A
Fig. 11B

DC-TO-DC SWITCHING POWER SUPPLY UTILIZING A DELTA-SIGMA CONVERTER IN A CLOSED LOOP CONTROLLER

BACKGROUND OF THE INVENTION

The present invention relates to the electrical power supply art and, more particularly, to an improved DC-to-DC switching power supply which utilizes a delta-sigma ($\Delta\Sigma$) converter in a closed loop controller.

Switching power supplies are wide spread in use due to their high conversion efficiencies, reliability, simplicity and low cost. DC-to-DC switching power supplies operate by storing energy in inductors, capacitors, or both, and then distributing this energy to a load over a period of time. Low output voltage variation is achieved by using energy storage devices that hold many times the energy to be distributed in a given time period. The most popular way of accomplishing this task is to vary the charging time for the energy storage device(s) depending upon the load, for each time period. This technique is known as pulse-width-modulation (PWM). In a PWM power supply, the charging time, per given period, changes with respect to the load. FIG. 1A is a waveform diagram illustrating the typical output voltage, $V_{out}$, produced by a PWM controller. The output voltage, $V_{out}$, varies about a set-point, or reference level voltage, $V_{ref}$. The system operates to minimize the value of an error voltage, which represents the difference between the desired DC output of the switching power supply and the reference value, $V_{ref}$.

The PWM controller converts the error signal, $V_{out}$-$V_{ref}$, into a sequence of variable width pulses, as depicted in FIG. 1B. These variable width pulses are applied to the power supply circuitry to vary the DC output produced thereat in an attempt to control the output voltage to the desired reference level. For changing loads, the storage device(s) will charge and discharge at different rates, requiring different PWM duty cycles to maintain the desired average output voltage. For example if the Load Change signal in FIG. 1A is less than $V_{ref}$ then more energy is needed at the load to bring its level up. This is achieved by the PWM change to "$V_{hi}$" (output on). When there is too much energy in the load, the LOAD CHANGE level becomes greater than $V_{ref}$ and the "PWM CHANGE" will switch to "$V_{lo}$" (output off).

Whereas pulse-width-modulated power supply controllers have achieved wide acceptance, largely due to their cost effectiveness and availability in integrated circuit form, they do exhibit various disadvantages. For example, the creation of the error voltage requires the use of matched components. The accuracy of the PWM controller is thus limited to the accuracy of the matched components which are subject to tolerance drift over time.

In addition, the noise spectrum produced by a PWM controller ideally contains all noise at the switching frequency, which noise can feed directly from the to power supply to the circuits it supplies with power. In addition, due to clock jitter, component mismatch and other circuit non-idealities, the noise spectrum of a PWM controller tends to concentrate the error voltage at several frequencies, dependent on load. These unpredictable noise spikes are often unfilterable and result in noise coupling into the circuits being powered by the PWM supply.

In addition, if the duty cycle of a PWM controller goes too low, the electronic switch in the switching power supply is forced into a state in which it never gets fully turned on and, hence, consumes increased power.

Further, the PWM switching power supply controller does not readily lend itself to digital programmability of the produced DC output voltage.

SUMMARY OF THE INVENTION

It is an object of the present invention, therefore, to provide an improved DC-to-DC switching power supply converter design which provides for the precise, low drift control of output voltage with high efficiency and simplicity of design.

In particular, it is an object of the present invention to provide the improved DC-to-DC switching power supply converter controller which eliminates the need for matched components.

It is an additional object of the invention to provide the improved DC-to-DC switching power supply converter design which exhibits a noise spectrum shifted to higher frequencies, thereby allowing for easier filtering to prevent the corruption of circuitry connected to the power supply output.

It is also an object of the invention to randomize the error signal over higher frequencies so that the noise power is spread out instead of being concentrated at specific frequencies.

It is a further object of the invention to provide the improved DC-to-DC switching power supply converter design which is easily adapted to receive digital input reference signals to thereby vary the level of the power supply produced output voltage.

It is yet a further object of the invention to provide the improved switching power supply converter design which does not rely on variable width pulses to control the electronic switching device in the power supply.

Briefly, according to the invention, a DC-to-DC converter comprises a switching power supply which has a power input terminal adapted to connect to a source of DC power, a control terminal adapted to receive a control input signal and an output terminal for producing a controlled output DC signal having a value which is controlled by the control signal received at the control terminal. The converter utilizes a controller having a first input coupled to the switching power supply output terminal, a second input which is adapted to receive a reference signal and an output coupled to the switching power supply control terminal. The controller produces fixed width output pulses as a function of the relationship between the signals at its first and second inputs, such that the switching power supply produces a controlled output DC signal maintained at a value determined by the received reference signal.

In a particular aspect of the invention, the switching power supply controller includes a first summer for producing an output signal representative of the difference between the switching power supply produced controlled output DC signal and the received reference signal. A proportional gain scales the error signal by a proportional gain factor to produce a proportional feedback signal. An integrator integrates and scales the error signal by an integral gain factor to produce an integrated feedback signal. A second summer sums the proportional feedback signal and the integrated feedback signal. The controller includes means for producing the fixed-width output pulses as a function of both of the feedback signals.

In a further aspect of the invention, the power supply controller further comprises a differentiator for differentiating and scaling the output signal by a differential gain factor to produce a differentiated feedback signal. The differentiated feedback signal is summed in the second summer with the proportional feedback signal and the integrated feedback signal. Thus, the controller produces its fixed-width output pulses as a function of all three feedback signals.

In yet a further aspect of the invention, the DC-to-DC converter utilizes a delta-sigma converter for producing the fixed-width pulses.

In a further aspect of the invention, the power supply controller's second input includes means adapted to receive a digital input signal representative of a desired analog output level by the DC-to-DC converter.

A method for controlling the output of a switching power supply having an input terminal adapted to receive an input DC supply signal, a control terminal for receiving a control signal and an output terminal, wherein the switching power supply produces at its output terminal a DC signal having a value controlled by the control signal received at the control terminal, includes the first step of receiving a reference signal representative of the desired output DC signal value from the switching power supply. The method then processes the switching power supply output DC signal to produce a feedback signal representative of the signal thereat. The next step includes comparing the reference signal with the feedback signal to produce an error signal. The method includes the final step of predeterminedly converting the error signal into a sequence of fixed-width pulses and applying the fixed-width pulse sequence to the control terminal of the switching power supply such that the switching power supply produced controlled output DC signal is maintained at a value determined by the received reference signal.

In a further aspect of the present invention, the above-described method includes the step of scaling the error signal by a proportional gain factor to produce a proportional feedback signal. The error signal is then integrated and scaled by an integral gain factor to produce an integrated feedback signal. The proportional feedback signal and integrated feedback signal are summed to produce said error signal.

In a further aspect of the invention, an output current sense signal is sampled and scaled by a differential gain factor to produce a differentiated feedback signal and this differentiated feedback signal is then summed with a proportional feedback signal and integrated feedback signal to produce said error signal.

In yet a further aspect of the invention, the step of predeterminedly converting the error signal into a sequence of fixed-width pulses includes the delta-sigma conversion of the error signal into said sequence of fixed-width pulses.

In yet a further aspect of the invention, the reference signal is received as a digital input signal representative of a desired analog output level of the switching power supply.

These and other objects of the present invention will be observed in the reading of the specification and claims which follow hereinbelow.

BRIEF DESCRIPTION OF THE FIGURES

FIGS. 1A and 1B are representative waveforms of the prior art pulse-width modulator power supply controller;

FIG. 2 is a block diagram illustrating the improved pulse code modulated controller for use in the DC-to-DC switching power supply converter;

FIGS. 10A and 10B are waveform diagrams illustrating the power spectral density of an ideal pulse width modulated-based switching power supply output voltage and error voltage, respectively;

FIGS. 11A and 11B are waveform diagrams illustrating the power density plot of the noise produced by the inventive pulse code modulated power supply.

DETAILED DESCRIPTION

Figure 3:
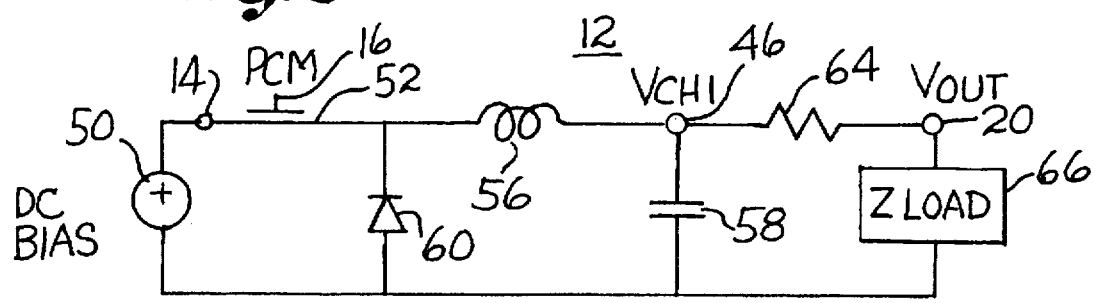
FIG. 3 is a schematic diagram of a Buck switching power supply used in the preferred embodiment of the invention.

As described above, FIGS. 1A and 1B depict representative waveforms of the prior art pulse-width modulated (PWM) controller for use in a switching power supply. PWM controllers use ramp generating circuitry to create a control, or error voltage representative of the difference between the actual output voltage being produced by the power supply and a desired reference level, $V_{ref}$. This results in the output waveform seen in FIG. 1A.

In response to the error signal, the PWM controller produces a variable width pulse sequence, as depicted in FIG. 1B. This variable width sequence varies the conduction time of an electronic switching device in the power supply thereby determining the energy transferred to the storage device(s). For changing loads, the storage device(s) will charge and discharge at different rates, requiring different PWM duty cycles to maintain the desired output voltage. Implementation of the PWM controller requires the use of matched components which, over time, may drift. In addition, the power spectrum of the noise produced by the PWM controller has load dependent, high energy noise spikes which can corrupt circuitry drawing power from the switching power supply. In addition, if the PWM controller requires a very narrow pulse, the electronic switching device may not make the transition from its fully off to fully on state, thereby dissipating power in the electronic switching device and reducing controller power supply efficiency. Finally, the PWM controller topology does not readily lend itself to a digitally programmable input of the reference voltage.

FIG. 2 is a block diagram of the pulse code modulated power supply controller, indicated generally at 30, according to the present invention. Here, as with the PWM power supply circuitry, a basic switching power supply, including one or more energy storage devices, is provided at 12. The switching power supply 12 has an input terminal 14 for receiving the variable DC power supply voltage. At its control input 16, the switching power supply 12 receives fixed-width pulse code modulated (PCM) control signals, depicted by the waveform 18. These control signals, as will be described herein below, are used to control the switching of an electronic switch within the switching power supply 12 to thereby control power stored in one or more energy storage devices. These energy storage devices then produce a controlled output DC signal, $V_{out}$, at the switching power supply output terminal 20.

The fixed-width control pulses 18 applied at the control input 16 of the switching power supply 12 are produced by unique controller circuitry, indicated generally at 30. The controller circuitry 30 includes a first summer 32 which receives at one input the output voltage $V_{out}$ produced at the output terminal 20 of the switching power supply 12 and a reference voltage, $V_{ref}$ at its second terminal. $V_{ref}$ is a reference voltage used to control the DC output, $V_{out}$, produced by the switching power supply 12. This signal may be supplied as an analog input signal or, as shown in FIG. 2, may be a digital input signal which is then processed through a digital to analog converter 34 to thereby produce $V_{ref}$. The topology of the present controller 30 particularly lends itself to digital input control as depicted in FIG. 2.

First summer 32 sums the output signal $V_{out}$ with the reference signal $V_{ref}$ to produce a difference signal representing the difference between the actual output voltage $V_{out}$ and the desired output $V_{ref}$. This error signal, produced at the output of first summer 32, is fed to the inputs of a proportional gain block 36 and an integrator 38. The proportional gain block 36 scales the error signal by a first gain factor K1. Thus, the output from proportional gain block 36 is a proportional feedback signal, which is applied to one input of a second summer 40.

Applied to a second input of the summer 40 is the integrated error signal as processed through the integrator 38. The integrator also inherently scales the integrated error signal by a predetermined factor K2 to thereby provide an integral gain factor integrated feedback signal. The second summer 40 sums the proportional feedback signal with the integrated feedback signal to thereby produce a resulting error signal which is coupled to the input of a delta-sigma converter 42. In the known manner, the delta-sigma converter 42 converts the error signal at its input into a sequence of fixed-width pulses which are applied to the control input 16 of the switching power supply 12.

If the error signal presented at the input to delta-sigma converter 42 was determined only by the proportional gain feedback signal out of block 36, a finite offset voltage from the desired $V_{out}$ signal at output 20 of the switching power supply 12 would occur due to tolerances of components. To eliminate this finite DC offset voltage, the integrator 38 is employed to absorb such offsets and also decrease settling time of the output signal $V_{out}$. However, use of the integrator 38 was found to induce substantial ringing in the output voltage $V_{out}$. To eliminate such ringing, a differentiator 44 is employed. The differentiator 44 senses the first time differential of the output signal $V_{out}$ by means of a current sense resistor as provided at the output 46 of the switching power supply. This output signal, which is proportional to the rate of change of the output voltage with respect to time, is scaled by a third gain factor K3. The output scaled differentiated feedback signal is then applied as an additional input to the second summer 40. Thus, controller 30 employs proportional, integral and differential (PID) feedback to produce the error signal at the input of the delta-sigma converter 42.

The switching power supply design 30 as depicted in FIG. 2 exhibits many advantages over the PWM designs known to the prior art. For example, the delta-sigma modulator 42 is an excellent choice for converting an analog input signal into a pulse code modulated control signal because it is highly insensitive to component mismatches. The delta-sigma converter accomplishes this by trading off sampling rate for accuracy taking many poor samples and filtering, rather than one precise sample to arrive at the same solution. Thus, there is no need for the matching of components as in the PWM design. Without such matched components, there is not a tolerance drift over time as in the PWM topology. In addition, the delta-sigma converter 42 is an inherently more linear converter while being simple in implementation.

FIG. 3 is a schematic diagram of the actual switching power supply 12 used in the preferred embodiment of the invention. This circuit, known as a Buck converter, receives DC current from a power supply 50 at its input terminal 14. The DC supply voltage is then switched to the energy storage devices through an electronic switch 52. Any of various electronic switches may be used in this application but, in this, the preferred embodiment of the invention, the electronic switch comprised a power MOSFET device. Received at the switching input 16 to the switching power supply 12 is the pulse code modulated (PCM) input signal produced by the converter 30 as shown in FIG. 2. This signal is a sequence of fixed-width pulses designed to activate the electronic switching device from its "off" to "on" states as a function of the pulse sequence. Current, as switched thorough the electronic switching device, flows into the energy storage inductor 56. Coupled from the output of the inductor to ground is an energy storage capacitor 58. A diode 60 has its cathode connected to the output of the electronic switch 52 and its anode connected to ground. The diode acts as a free-wheeling diode for load current when electronic switch 16 is off.

In response to the PCM control signal and its input signal 16, the electronic switch 52 pumps current through inductor 56 and creates a stored charge on capacitor 58. This signal is then supplied, through a low value sampling resistor 64, to the output terminal 20 which produces the output signal $V_{out}$ which may then be coupled to a load 66.

The sampling resistor 64 produces a voltage Vcshi which samples the current out of inductor 56 and capacitor 58. Since the current through capacitor 58 is proportional to the first time differential of the voltage across the capacitor, this signal $V_{cshi}$ is proportional to the first time differential of $V_{out}$ and is supplied at an output terminal 46, which connects to the input of the differential gain block.

Figure 4:
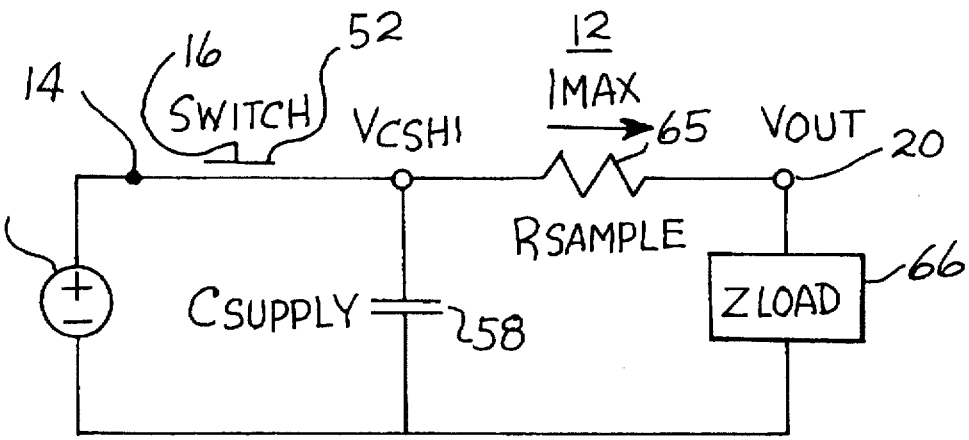
FIG. 4 is a schematic diagram depicting a simplified electrical model of the Buck power supply of FIG. 3.

FIG. 4 is an electrical model of the Buck switching power supply topology as shown in FIG. 3. As before, shown is the DC source 50 which connects to the input terminal 14 of the power supply 12. An electronic switch 52 receives input control signals at its input 16. Through the action of the switch 52, a stored charge is created in the capacitor 58. Current provided to the output terminal 20 is sensed by a small value sampling resistor 65. The signal $V_{out}$ appearing at the output terminal 20 may thus be applied to a load 66, with the voltage across the capacitor being $V_{cshi}$.

In operation, in response to the fixed-width PCM pulse sequences applied at input terminal 16, the switch creates a stored charge in the capacitor 58. By precisely controlling charging of the capacitor 58 through the switch 52 the output voltage $V_{out}$ at output terminal 20 may be precisely controlled within narrow tolerances.

Figure 5:
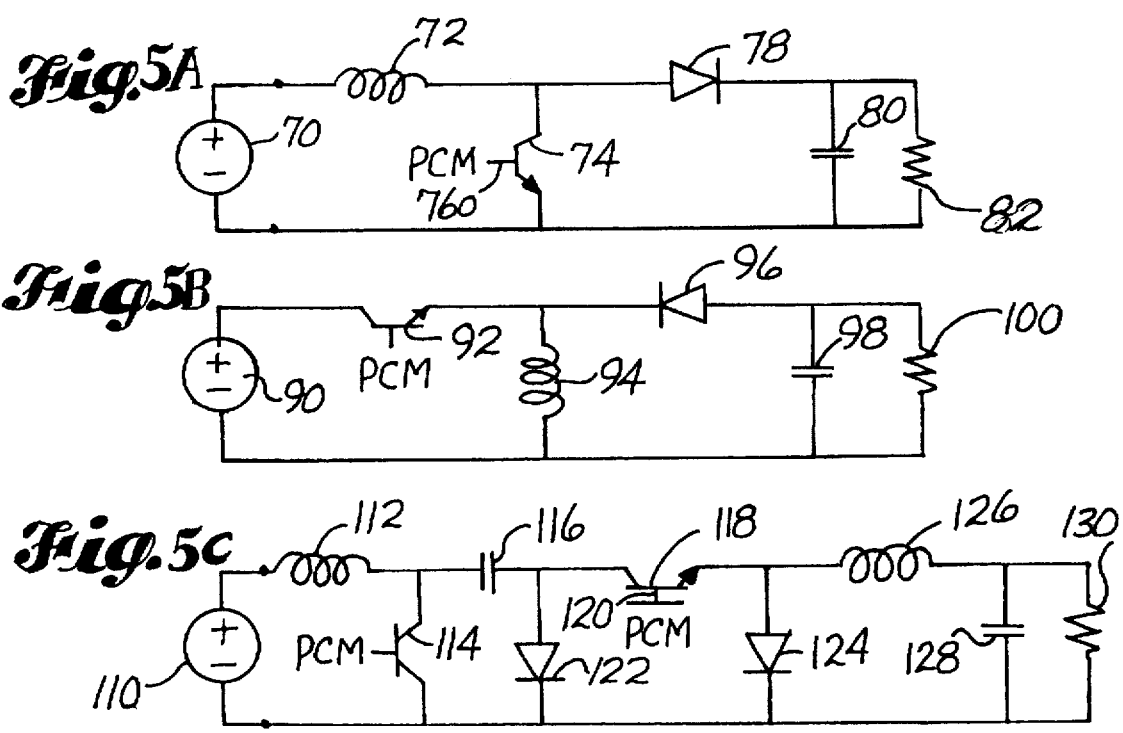
FIGS. 5A–5C depict three additional power converter circuits which may be used with the controller in accordance with the present invention.

Whereas the preferred embodiment of the invention utilizes a Buck switching power supply as depicted in FIG. 3, it should be understood that many other power supply designs may be utilized in accordance with the present invention. A few of these are identified in FIGS. 5A through 5C.

Whereas the Buck circuit of FIG. 3 is utilized to reduce the input DC bias signal to a lower value, a boost circuit, as depicted in 5A may be employed to increase the input DC bias voltage to a higher value. Here, the DC bias input 70 is applied to an inductor 72. At the output of inductor 72 is a switching device, herein indicated as transistor 74. In response to control signals received at its base 76, the transistor 74 switches the output of inductor 72 to ground. Energy is stored in inductor 72. In response to a low control signal received at its base 76, the transmission gate 74 shuts off and the energy in the inductor 72 is transferred to capacitor 80 via the rectifying diode 78.

FIG. 5B depicts a Buck-Boost circuit. Here, a DC bias voltage is applied to the collector input of a switching transistor 92. Received at the base of transistor 92 is the pulse code modulated pulse sequence. The transistor switches current to a shunt inductor 94. The output from the inductor 94 is rectified through a diode 96 and applied to a storage capacitor 98. The voltage across storage capacitor 98 is thus the controlled output voltage which is applied to a load 100.

FIG. 5C depicts a Cuk converter. Here, a DC bias supply 110 provides power to an inductor 112. The free end of the inductor 112 is shunted to ground via a transistor 114, whose base receives the input pulse code modulated signal. The output from inductor 112 passes through a capacitor 116 to a second electronic switching device 118. This switching device is a transistor having a received signal at its base 120 which is the inverse of the pulse code modulated signal. A pair of diodes 122, 124 on opposite sides of the transistor 118 are used to provide continuous paths for the currents titrough inductors 112, 126 when transmission gates 114, 118 are alternately tuned off and on.

The output from transistor 118 passes through a second inductor 126 which provides charge to the storage capacitor 128. The load 130 is coupled to and across the output capacitor 128.

Figure 6:
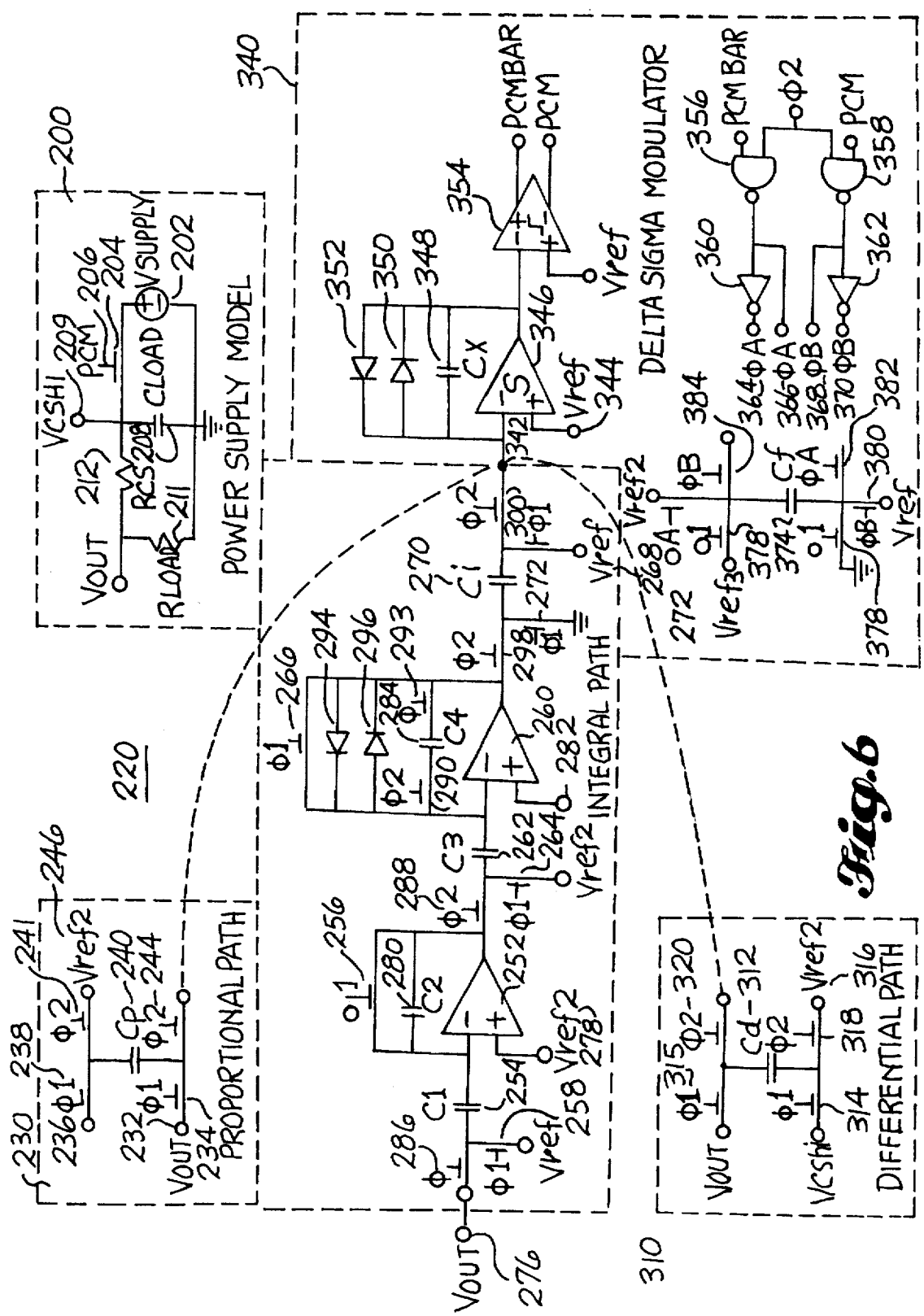
FIG. 6 is a detailed schematic diagram depicting the preferred embodiment of the pulse code modulated controller according to the present invention.

FIG. 6 is a schematic diagram illustrating the preferred embodiment of the present invention.

Shown is a simplified power supply, 200. The power supply includes input terminals 202 adapted to receive an input source of DC current. Connected in series with the power supply input terminals 202 is an electronic switching device 204. The switching device has a control input terminal 206 which receives control input signals to determine the conduction time of the switching device 204. The switching device then switches current into a storage capacitor 208. The storage capacitor 208 provides a controlled DC output voltage $V_{out}$ at an output terminal 210 through a small sampling resistor 212. The storage capacitor 208 delivers power to the load resistor 211.

The controller circuitry, indicated generally at 220, includes a proportional feedback block 230, an integral feedback block 250 and a derivative feedback block 310. The signals as processed through the proportional block 230, integral block 250 and differential block 310 are fed into the delta-sigma block 340 at its summing node 342. The output from the delta-sigma block 340 is the pulse code modulated control signal which is applied to the control input terminal 206 of the power supply.

Figure 7:
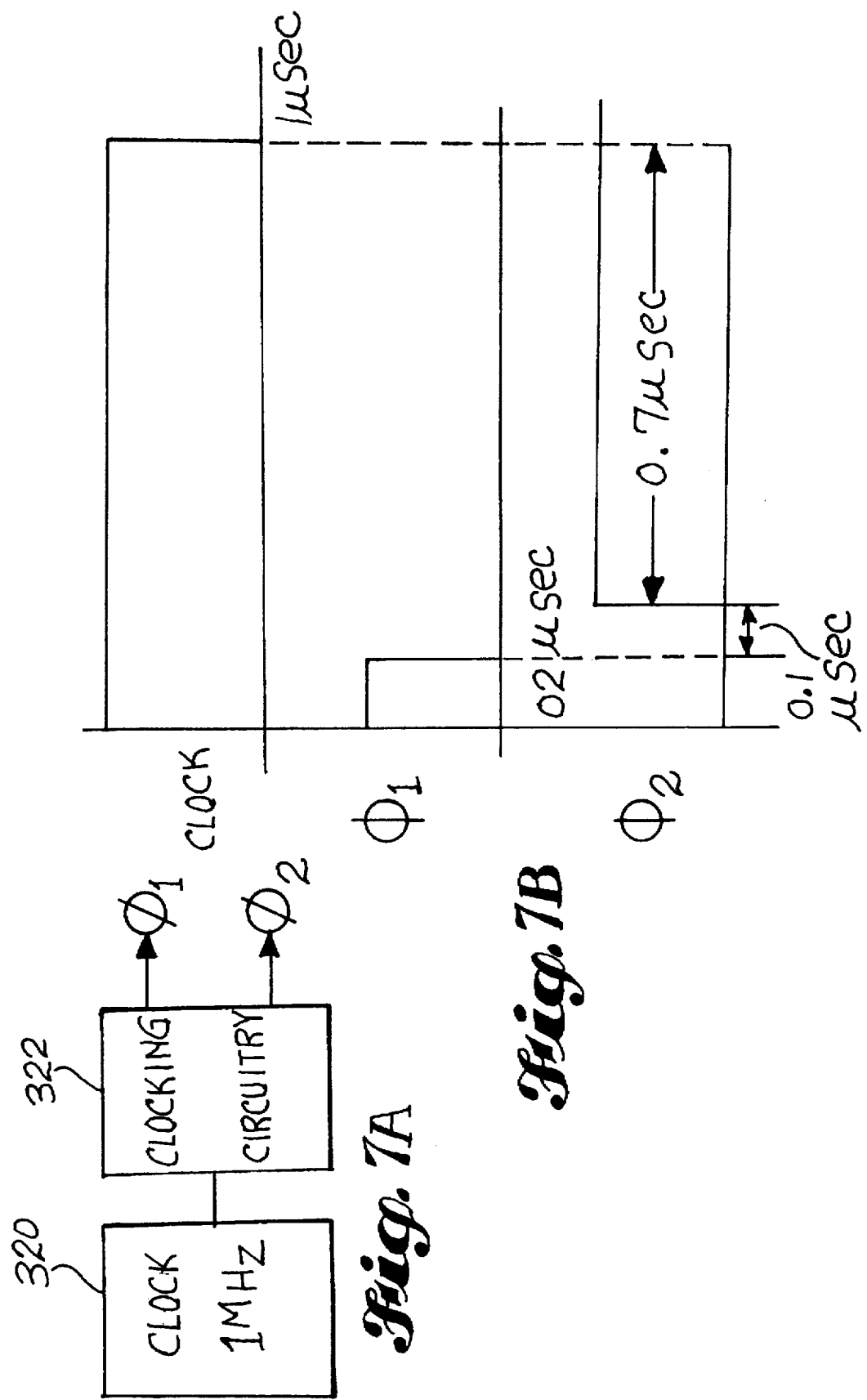
FIG. 7A and 7B are a waveform diagram illustrating the preferred phasing of the clock for use in the preferred embodiment depicted in FIG. 6.

FIG. 7 represents the clocking circuitry used in conjunction with the controller 220 of FIG. 6. Referring to FIG. 7A, a one MegaHertz clock is provided at block 320. This output clock signal is fed to clocking circuitry 322 which produces two clock phases $\emptyset_1$ and $\emptyset_2$.

Referring to FIG. 7B, shown is the clock signal having a period of 1.0 microsecond. The first phase $\emptyset_1$ signal occurs for the first 0.2 microseconds of the clock period. The second phase signal $\emptyset_2$ then initiates 0.1 microseconds following termination of the first phase $\emptyset_1$ signal and continues for the remaining 0.7 microseconds of the clock period. These clocking signals $\emptyset_1$, $\emptyset_2$ are used to control the circuitry depicted in FIG. 6 as described hereinbelow.

Referring again to FIG. 6, the output signal $V_{out}$ from the power supply appearing at terminal 210 is routed to the input terminal 232 of the proportional block 230. On $\emptyset_1$ the difference between $V_{out}$ 232 and $V_{ref}$ 236 is sampled on capacitor 240 via transmission gates 234, 238. On $\emptyset_2$ this difference, is transferred to the delta-sigma modulator via transmission gates 242, 244 with respect to voltage $V_{ref2}$ 246.

The proportional block acts to sample a charge, ($V_{out}$ - $V_{ref}$) * C, that is summed at the summing node 342 of the delta-sigma modulator.

Referring now to the integral block, the negative of the offset of the first amplifier 252 is sampled on capacitor 254 via transmission gates 256, 258 during $\emptyset_1$. The second amplifier 260 also samples the negative of its offset on capacitor 262 during $\emptyset_1$ via transmission gates 264, 266. Furthermore on $\emptyset_1$, a negative $V_{ref}$ 268 is sampled on capacitor 270 via transmission gates 272, 274.

On $\emptyset_2$ the difference between $V_{out}$ at 276 and $V_{ref2}$ at 278, plus the $-V_{offset}$ of amplifier 252 already sampled on $\emptyset_1$ are transferred as a charge to capacitor 280 via transmission gate 286 which causes the output of amplifier 252 to change proportional to capacitor 254/capacitor 280.

The difference between the output of amplifier 252 and $V_{ref}$ 282, plus the already sampled offset of amplifier 260 is added as a charge to capacitor 284 via transmission gates 288,290, 293. Diodes 294, 296 bleed off some of the charge on capacitor 284 if it gets too large to keep amplifier 260 from saturating. The charge on capacitor 284 causes the output of amplifier 260 to be at $V_{ref}$ plus the voltage across capacitor 284.

The voltage at the output of amplifier 260 is sampled with respect to $V_{ref}$ at 322 on capacitor 270 via transmission gates 298, 300 during $\emptyset_2$. The charge, $-V_{ref}$ that was already on capacitor 270 is summed at the summing node 342 as is the output of the amplifier 260 minus $V_{ref}$.

The integral path 250 consists of two amplifiers 252, 260 so that a high gain can be achieved between the input and output of the integral path while maintaining a high bandwidth in the integral path.

Thus, in the known manner, the integral block 250, by the switching of its transmission gates, will produce an error signal corresponding to the difference between the power supply output signal $V_{out}$ and the reference voltage $V_{ref}$, integrate this error signal in 2 steps, scale by a predetermined gain factor, and provide the integrated, scaled feedback signal at the summing node 242.

Differential block 310 operates to sense the current through current sensing resistor 212 which thereby represents the first time differential of the voltage across storage capacitor 208. The voltage across current sense resistor 212 is sampled on capacitor 312 via transmission gates 314, 316 as a charge, during $\emptyset_1$. During $\emptyset_1$ the charge on capacitor 312 is transferred to the delta-sigma's summing node 342 with respect to $V_{ref2}$ at 316 via transmission gates 318, 320.

Thus the proportional, integral and differential signals are passed to the delta-sigma on $\emptyset_2$ as charges via the summing node 342.

The delta-sigma block 340 integrates the contributions of the three paths onto capacitor 348 via amplifier 346. Here, diodes 350, 352 act to keep amplifier 346 from saturating by bleeding some charge from capacitor 348 if the charge gets too large.

The output of amplifier 346 is presented to the clocked, latching comparator 354 which produces both the PCM and PCMBAR control signals. The control signals are opposite in polarity and can be used to control switching power supplies with either one or two control signals like those shown in FIG. 5.

The outputs of comparator 354 also provide input to the AND gates 356, 358 to form control feedback signals, $\emptyset_A$ and $\emptyset_B$ and their complements at 364, 370, 366, 368 respectively. On $\emptyset_1$ a third reference signal, $V_{ref2}$ at 372, is sampled with respect to ground onto capacitor 374 via transmission gates 376, 378. The control signals 364, 366, 368, 370 are used to control transmission gates 380, 382, 284, 386 which act to present either $V_{ref3}$ or $-V_{ref3}$ at the summing node 342 of the delta-sigma block 340 during $\emptyset_2$. This constitutes the negative feedback loop of the delta-sigma modulator.

Thus, the delta-sigma converter converts the analog error feedback signal appearing at its summing input node 342 to a predetermined sequence of fixed-width pulses which are then applied to the control input terminal 206 of the switching power supply. The sequence of fixed width pulses is controlled such that the output signal $V_{out}$ appearing at the output 210 of power supply 200 stabilizes at a value determined by the reference level signal $V_{ref}$.

Figure 8:
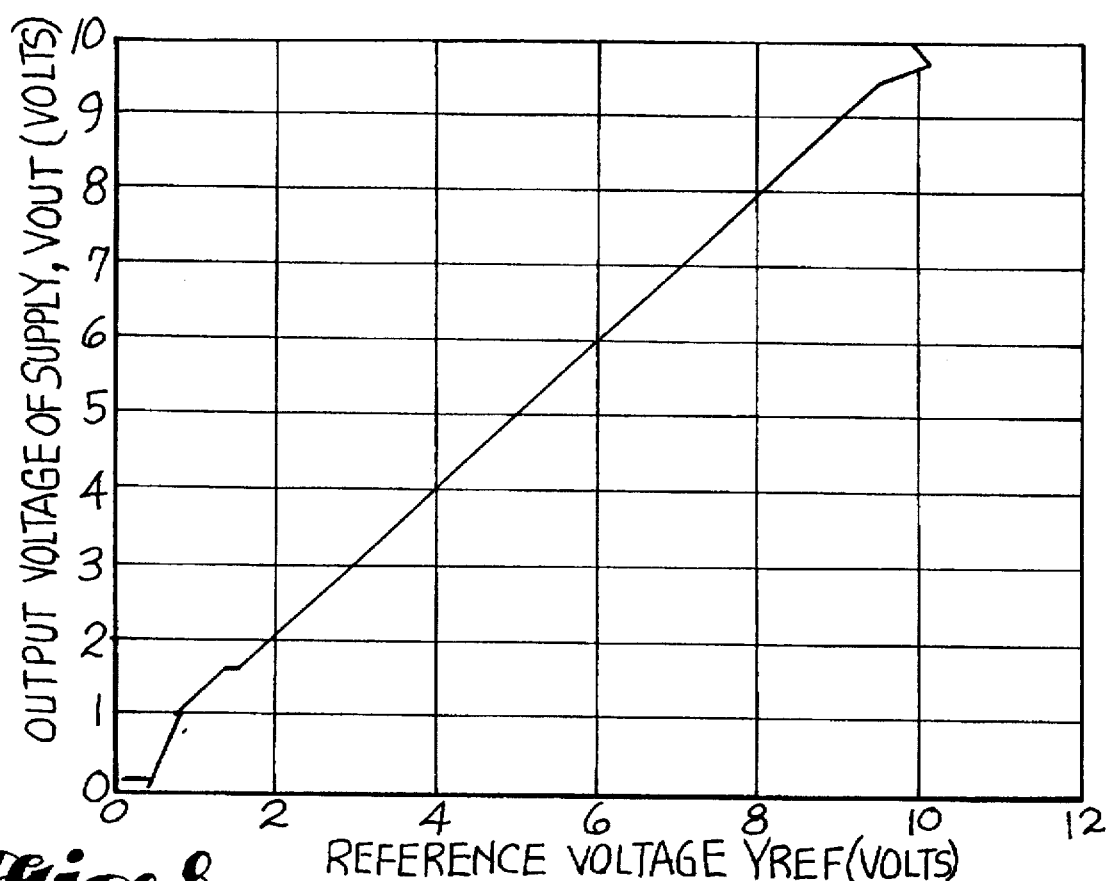
FIG. 8 is a graph depicting the output voltage of the improved switching power supply converter as a function of input reference voltage.

FIG. 8 is a graph depicting the manner by which output voltage $V_{out}$ of the power supply tracks the reference voltage $V_{ref}$ for the preferred embodiment of the invention as shown in FIG. 6. Note the extreme linearity of the output versus $V_{ref}$ control voltage performance characteristic.

Figures 9A, 9B:
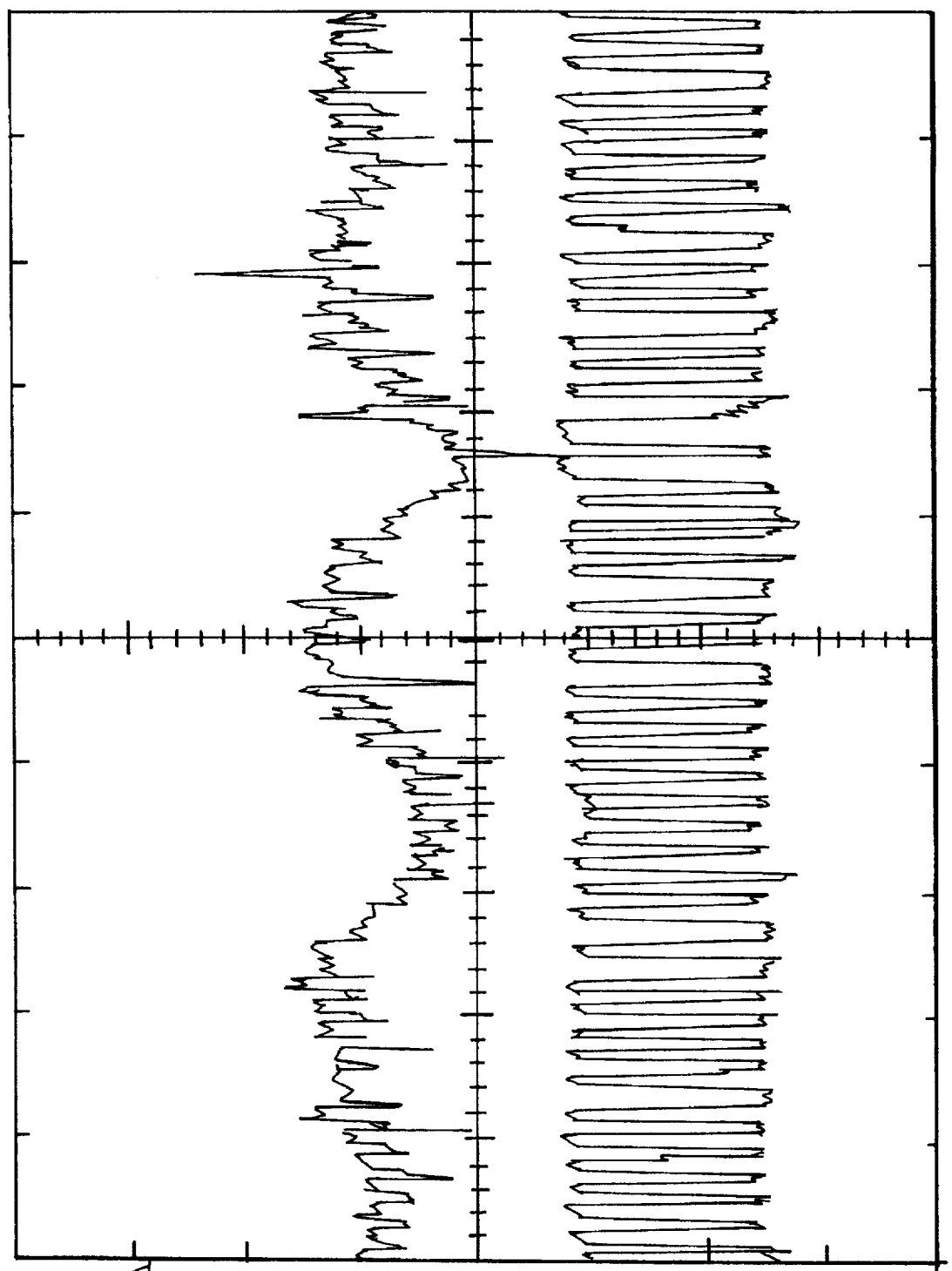
FIGS. 9A and 9B are waveform diagrams illustrating the control voltage and output voltage produced by the inventive pulse code modulated controller.

FIGS. 9A and 9B depict waveforms of the control voltage provided to the power supply control input terminal and the resulting output voltage of the power supply, respectively.

FIGS. 10A and 10B are power spectral density plots of the power supply output voltage and power supply error voltage, respectively, for a pulse-width modulated typed power switching supply. Note the high energy noise at specific frequencies.

The pulse-width modulated power spectral density should be compared with the power spectral density plot of the pulse code modulated supply, according to the present invention, as depicted in FIG. 11. FIG. 11A is a power spectral density plot of the switching power supply output voltage for the pulse code modulated controller as set forth in the present invention. FIG. 11B is a power spectral density plot of the power supply error voltage for the PCM controlled power supply. Note that the PCM type controller produces a spectral plot that contains noise spread across the spectrum, much of it at high frequencies where the switching power supply has its highest noise rejection. Since the power supply filters high frequencies, the noise that is pushed out there by the delta-sigma is mostly filtered out. Hence noise is randomized and distributed, unlike the PWM based power supply.

Figure 12A:
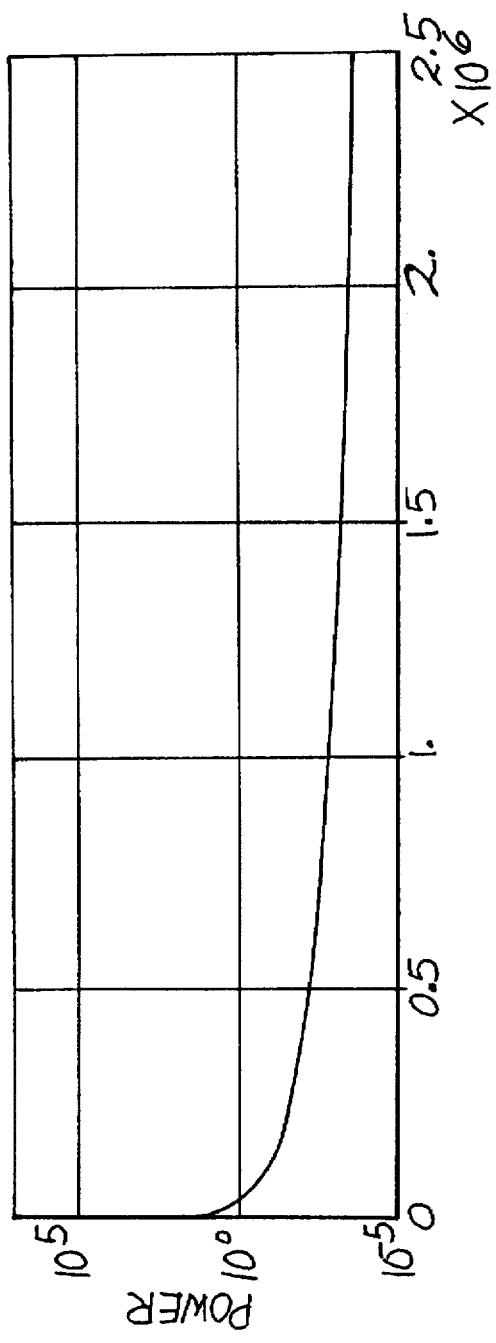
FIGS. 12A and 12B illustrate the power spectral density of the inventive pulse code modulated-based switching supply wherein the power supply's output capacitance is sized such that it's peak noise power is the same as a pulse width modulated-based switching power supply.
Figure 12B:
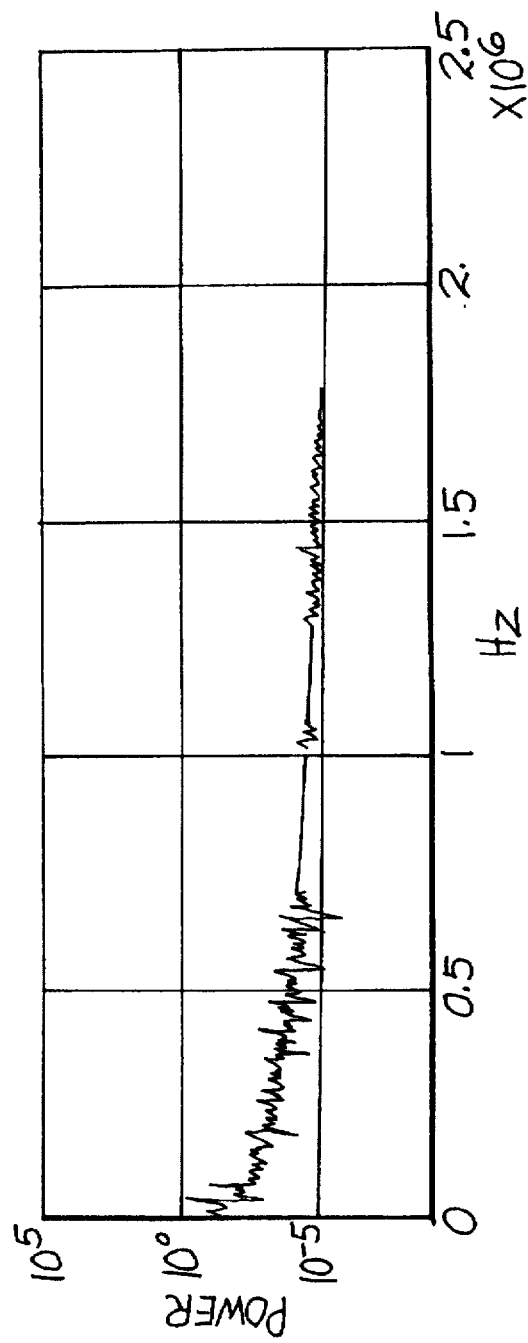

In fact, with reference to FIGS. 12A and 12B, shown are the power spectral densities of the PCM switching power supply output voltage and error voltage, respectively, for the PCM type switching power supply whose output capacitance has been sized such that its peak noise power is the same as with an ideal PWM based switching power supply. Note the low level of high frequency noise produced by this PCM controller in this configuration. Note also the spreading out of the noise over a bandwidth, rather than at specific frequencies.

In summary, a novel DC-to-DC converter design has been described which uses a switching power supply in conjunction with a pulse code modulated based controller. The controller includes proportional, integral and differential feedback paths to produce an error signal which is coupled through a delta-sigma converter to produce the output PCM pulses.

The inventive design does not require use of tightly matched components and, as such, exhibits low tolerance drift over time. In addition, it is simple to construct yet very linear in operation. Further, it pushes its power spectral noise density to high frequencies which are more easily filtered by the switching power supply, thereby reducing its high frequency output. Finally, it is easily adapted to receive digital control input signals such that it is particularly suited for digital control applications.

While a preferred embodiment of the invention has been described in detail, it should be apparent that many modifications and variations thereto are possible, all of which fall within the true spirit and scope of the invention.

We claim:

1. A DC-to-DC converter comprising:

a switching power supply having a power input terminal adapted to connect to a source of DC power, a control terminal for receiving a control input signal and an output terminal for producing a controlled output DC signal having a value which is controlled by the control signal received at said control terminal; and a controller having a first input coupled to said switching power supply output terminal, a second input adapted to receive a reference signal, and an output coupled to said switching power supply control terminal, said controller producing fixed width output pulses as a function of the relationship between the signals at its first and second inputs, such that the switching power supply produced controlled output DC signal is maintained at a value determined by said received reference signal, said controller further comprising:

first summing means for producing an output error signal representative of the difference between said switching power supply produced controlled output DC signal and said received reference signal;

proportional gain means for scaling said error signal by a proportional gain factor to produce a proportional feedback signal;

integrating means for integrating and scaling said error signal by an integral gain factor to produce an integrated feedback signal;

second summing means for summing said proportional feedback signal and said integrated feedback signal; and said controller including means for producing said fixed width output pulses as a function of both of said feedback signals.

2. The DC-to-DC converter of claim 1 wherein said controller further comprises:

differentiating means for differentiating and scaling said output signal by a differential gain factor to produce a differentiated feedback signal;

said differentiated feedback signal being summed in said second summing means with said proportional feedback signal and said integrated feedback signal, such that said controller produces said fixed width output pulses as a function of all three feedback signals.

3. The DC-to-DC converter of claim 1 wherein said controller comprises a delta-sigma converter for producing said fixed-width pulses.

4. The DC-to-DC converter of claim 2 wherein said controller comprises a delta-sigma converter for producing said fixed-width pulses.

5. The DC-to-DC converter of anyone of claims 1, 2, or 3 wherein:

said controller second input includes means adapted to receive a digital input signal representative of a desired analog output level by said DC-to-DC converter.

6. A method for controlling the output of a switching power supply having an input terminal adapted to receive an input DC supply signal, a control terminal for receiving a control signal and an output terminal, said switching power supply producing at its output terminal a DC signal having a value controlled by the control signal received at said control terminal, the method comprising the steps of:

a) receiving a reference signal representative of the desired output DC signal value from said switching power supply;

b) processing said switching power supply output DC signal to produce a feedback signal representative of the signal thereat;

c) comparing said reference signal with said feedback signal to produce an error signal, including the further steps of:
   i) scaling said error signal by a proportional gain factor to produce a proportional feedback signal;
   ii) integrating and scaling said error signal by an integral gain factor to produce an integrated feedback signal; and
   iii) summing said proportional feedback signal and said integrated feedback signal to produce said error signal; and d) predeterminedly converting said error signal into a sequence of fixed-width pulses and applying said fixed width pulse sequence to the control terminal of said switching power supply such that the switching power supply produced controlled output DC signal is maintained at a value determined by said received reference signal.

7. The method of claim 6 further comprising the step of:

differentiating and scaling said output signal by a differential gain factor to produce a differentiated feedback signal;

and step iii) comprises the step of:

summing said proportional feedback signal, integrated feedback signal and differentiated feedback signal to produce said error signal.

8. The method of claim 6 wherein step d) comprises the step of:

delta-sigma converting said error signal into a sequence of fixed-width pulses.

9. The method of claim 7 wherein step d) comprises the step of:

delta-sigma converting said error signal into a sequence of fixed-width pulses.

10. The method of any one of claims 6, 7, 8 or 9 wherein step a) further comprises the step of:

receiving said reference signal as a digital input signal representative of a desired analog output level by said switching power supply.

* * * * *